Figure 1:
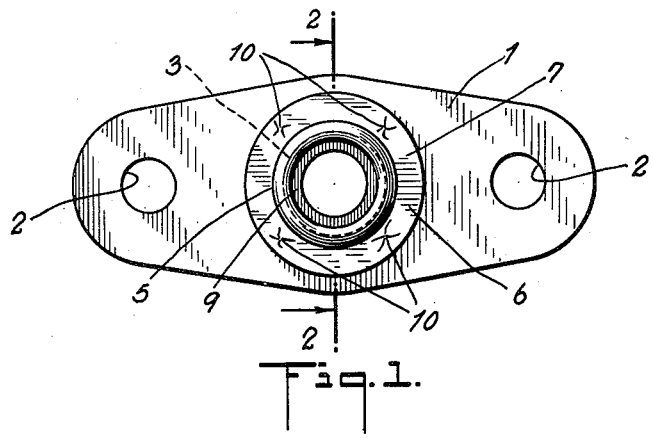

Jan. 1, 1946.                R. W. LUCE                2,391,989
                       THREADED LOCKING DEVICE
                         Filed Dec. 30, 1942

INVENTOR
RICHARD W. LUCE
BY
George T. Gill
ATTORNEY

Patented Jan. 1, 1946

2,391,989

UNITED STATES PATENT OFFICE 2,391,989

THREADED LOCKING DEVICE

Richard W. Luce, Southport, Conn.

Application December 30, 1942, Serial No. 470,587

4 Claims. (Cl. 151—7)

The invention herein disclosed relates to a threaded locking device and more particularly to a threaded locking device that is made up of several pieces.

An object of the invention is to provide a threaded locking device of such construction that it may be readily made on automatic equipment. Another object of the invention is to provide a device of this kind of such construction that the metal parts thereof may be stamped, drawn or extruded from sheet metal. A further object of the invention is to provide a device of the kind mentioned of such construction that it is comparatively light in weight and inexpensive to manufacture.

Figure 2:
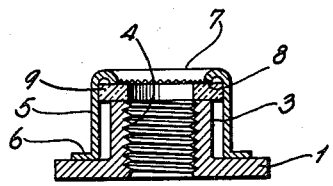
Figures 3, 4:
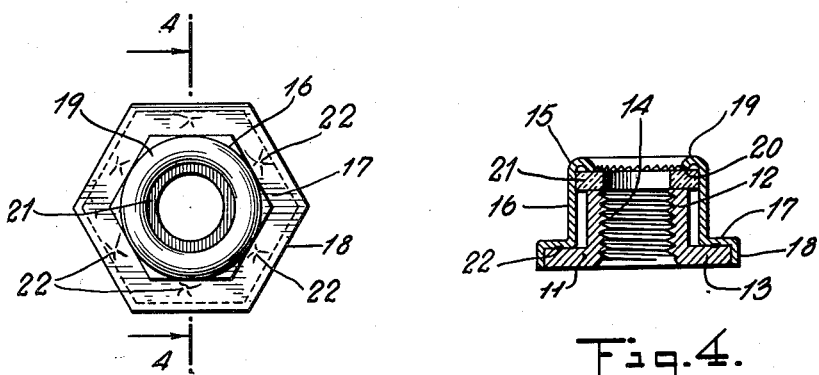

The foregoing and certain other objects and advantages that will hereinafter appear are realized in the specific embodiment of the invention illustrated in the accompanying drawing and described in detail below. The drawing includes:

Fig. 1 which is a plan view of an anchor nut embodying this invention;

Fig. 2 which is a sectional elevation of the same taken on line 2—2 of Fig. 1;

Fig. 3 which is a plan view of a hex nut embodying the invention; and

Fig. 4 which is a sectional elevation of the same taken on the line 4—4 of Fig. 3.

In the drawing, the threaded locking devices illustrated are of the kind in which a non-metallic, elastic washer is used to effect a locking action between the thread of the device and the thread of a bolt entered therein. It is to be understood, however, that the invention is not limited to such a threaded locking device. For example, the invention is applicable to threaded locking devices of the kind disclosed and described in the copending application Serial No. 322,650, filed March 7, 1940, for Threaded locking device. As applied to this form of threaded locking device, the invention is disclosed and claimed in an application filed concurrently herewith and entitled Threaded locking device.

In Figs. 1 and 2 of the drawing an anchor nut is illustrated. Such a nut includes a flange 1 that has spaced openings 2 therethrough. The openings 2 are provided so that the flange may be secured, as by rivets, to one of the two plates or structural members to be secured together by the nut, of which the flange forms a part, and a bolt or screw entered therein. The flange 1 is stamped from sheet metal and prior to stamping the flange from the sheet metal, a boss 3 is drawn. This boss extends perpendicular to the flange and it is tapped to form the load-carrying thread 4 therein. The thickness of the sheet metal from which this portion or element of the nut is made is, of course, sufficient for the boss to receive a thread and have the requisite pull strength.

Another metal element is formed from sheet metal. This element includes a cylindrical portion 5 of substantially greater internal diameter than the external diameter of the boss 3. At one end of the cylindrical portion 5, there is an outwardly extending, circular flange 6 which is adapted to engage the flange 1. At the opposite end of the cylindrical portion 5, there is an inturned flange 7, preferably with a somewhat axially extending edge 8. Desirably, for a purpose that will hereinafter appear, the edge 8 of the flange 7 may be serrated as indicated, forming a series of teeth therein.

A non-metallic washer 9 is stamped from elastic, fibrous material. The washer is circular and of an external diameter equal to the internal diameter of the cylindrical portion 5 of the external metal element. The internal diameter of the washer is less than the root or major thread diameter of the thread of the boss 3 and greater than the minor diameter of the thread.

The foregoing are the parts from which the anchor nut of Figs. 1 and 2 are assembled. In assembling the nut, the washer 9 is placed on the edge of the boss 3, or it may be pressed into the cylinder 5 until it engages the edge 8 of the inturned flange 7. The elements of which the cylinder 5 forms a part are then placed over the boss. In this position the flange 6 is secured to the flange 1, as by spot welding as indicated at 10 (Fig. 1).

It is desirable, in the assembled nut, that the washer 9 be compressed and rigidly clamped between the inturned flange 7 and the edge of the boss 3. To this end, the length of the cylindrical portion 5 is such that the distance between the surface of the flange 6, engaging the flange 1, and the washer engaging edge 8 of the inturned flange 7 is slightly less than the distance between the surface of the flange 1 and the outer surface of the washer 9 resting on the edge of the boss. In this way the elements must be forced together to bring the flanges 1 and 6 into contact for welding. The washer is thus securely clamped in place. The teeth formed on the edge 8 of the flange 7 bite into the fiber and materially assist in restraining the fiber washer against rotation with respect to the boss.

In Figs. 3 and 4 a like self-locking nut of hexagonal configuration, commonly called a hex nut, is illustrated. This nut comprises one element denoted generally by the numeral 11 that includes a cylindrical boss 12 extending perpendicularly from a flange 13. The boss 12 is tapped to form the load-carrying thread 14 therein. In this construction the flange 13 has a perimeter of polygonal configuration, specifically hexagonal.

An encasing element, denoted generally by the numeral 15, is stamped from sheet metal. This element includes a hexagonal case or portion 16 that is adapted to surround the boss 12 of the element 11. The internal transverse dimension of this case, across the flats, is slightly greater than the external diameter of the boss 12. At one end of the case, there is an outwardly extending flange 17 that has an axially extending edge portion 18 of hexagonal configuration. This edge portion 18 is adapted to enclose and engage the hexagonal edge of the flange 13 of the element 11. At the opposite end of the case 16, there is an inturned flange 19, which like the flange 7 of the nut of Figs. 1 and 2, extends over, in the assembled nut, the edge of the boss 12. The flange is desirably formed as shown so that the edge 20 thereof extends somewhat axially and with the edge thereof serrated.

In this hex nut, the elastic, fibrous washer 21 is desirably stamped with a hexagonal perimeter, complementary to the internal perimeter of the case 15. The opening through the washer is of a diameter less than the major or root diameter of the thread 14 and greater than the minor diameter of the thread.

The washer may either be placed on the edge of the boss 12 and the case 15 assembled thereover, or the washer may be placed in the case and then the case and washer assembled over the boss 12. In this nut also the length of the case is such that the washer must be compressed slightly in order to bring the flanges 13 and 17 into engagement. With the flange 17 in engagement with the flange 13, they are secured together by spot welding, as indicated at 22, Fig. 3. With the edge 18 of flange 17 engaging the hexagonal edge of the flange 13, wrenching torque applied to the case 16 does not strain the weld between the flanges. In both of the nuts illustrated and described, the flange of the threaded element constitutes the face of the nut.

From the foregoing description of the embodiments of the invention illustrated in the drawing and described above, it will be seen that by this invention there is provided a threaded locking device of the self-locking type that is inexpensive to manufacture, that is light in weight, and that is reliable in service.

It will be obvious that various other modifications may be made by those skilled in the art in the details of the embodiments of the invention illustrated in the drawing and described in detail above within the principle and scope of the invention as expressed in the appended claims.

I claim:

1. A threaded locking device comprising in combination a metal element including a flange forming the face of the device and a boss extending substantially perpendicularly thereto, the boss having the load-carrying threads therein, a stamped sheet metal element surrounding the boss of the first mentioned element and having an outwardly extending flange at one end secured to the flange of the first mentioned element and an inturned flange at the opposite end extending over the edge of the boss, and a non-metallic, elastic washer secured between the inturned flange of the second mentioned element and the edge of the boss and held in axial alignment with the boss.

2. A threaded locking device comprising in combination a metal element including a flange forming the face of the device and having a perimeter of polygonal configuration, and a boss extending substantially perpendicularly to the flange, the boss having the load-carrying thread therein, a stamped sheet metal element of polygonal configuration surrounding the boss and including an outwardly extending flange at one end secured to the flange of said first mentioned element and having a polygonal edge engaging the polygonal edge of the first mentioned element and an inturned flange at the opposite end extending over the edge of the boss, and means secured by said inturned flange of the second mentioned element for effecting a locking action between the thread of the device and the thread of a bolt entered therein.

3. A threaded locking device comprising in combination a metal element including a flange forming the face of the device and having a perimeter of polygonal configuration, and a boss extending substantially perpendicularly to the flange, the boss having the load-carrying thread therein, a stamped sheet metal element of polygonal configuration surrounding the boss and including an outwardly extending flange at one end secured to the flange of said first mentioned element and having a polygonal edge engaging the polygonal edge of the first mentioned element and an inturned flange at the opposite end extending over the edge of the boss, and a non-metallic, elastic washer secured between the inturned flange of the second mentioned element and the edge of the boss.

4. A threaded locking device comprising in combination a metal element including a flange forming the face of the device and a boss extending substantially perpendicularly thereto, the boss having the load-carrying thread therein, a stamped sheet metal element surrounding the boss of the first mentioned element and secured at one end to the flange of the first mentioned element, an inturned flange at the opposite end of the second mentioned element extending over the edge of the boss, and a resilient washer secured between the inturned flange of the second mentioned element and the edge of the boss and held in axial alignment with the boss.

RICHARD W. LUCE.